United States Patent [19]
Kikinis et al.

[11] Patent Number: 5,805,921
[45] Date of Patent: Sep. 8, 1998

[54] ENHANCED INTEGRATED DEVICE ELECTRONICS (EIDE) INTERFACE FOR CONTROLLING COMMUNICATION BETWEEN CPU AND NINE STORAGE DRIVES INCLUDING TAPE DRIVE, CD-ROM DRIVE, AND SEVEN HARD DISK DRIVES

[75] Inventors: Dan Kikinis, Saratoga; Pascal Dornier, Sunnyvale, both of Calif.

[73] Assignee: Elonex I. P. Holdings Ltd., London, United Kingdom

[21] Appl. No.: 595,678

[22] Filed: Jul. 11, 1995

Related U.S. Application Data

[63] Continuation of Ser. No. 33,839, Mar. 19, 1993, abandoned.

[51] Int. Cl.⁶ ..................................................... G06F 15/02
[52] U.S. Cl. ............................................................... 395/822
[58] Field of Search .................................. 395/821–823, 395/825, 828, 840, 834, 842, 831, 846, 856, 883, 500, 281, 280, 284, 841, 309, 182.03

[56] References Cited

U.S. PATENT DOCUMENTS

| | | | |
|---|---|---|---|
| 4,805,090 | 2/1989 | Coogan | 395/894 |
| 5,018,095 | 5/1991 | Nissimov | 364/900 |
| 5,077,683 | 12/1991 | Aydin | 364/708 |
| 5,104,237 | 4/1992 | Masters et al. | 364/900 |
| 5,150,465 | 9/1992 | Bush et al. | 395/275 |
| 5,233,594 | 8/1993 | Wilhelm | 369/75.1 |
| 5,239,632 | 8/1993 | Larner | 395/275 |
| 5,265,208 | 11/1993 | Moore et al. | 395/500 |
| 5,295,247 | 3/1994 | Chang et al. | 395/309 |
| 5,297,124 | 3/1994 | Plotkin et al. | 395/500 |
| 5,313,617 | 5/1994 | Nakano et al. | 395/500 |
| 5,379,382 | 1/1995 | Work et al. | 395/500 |
| 5,434,722 | 7/1995 | Bizjak et al. | 360/69 |
| 5,446,877 | 8/1995 | Liu et al. | 395/180 |
| 5,530,960 | 6/1996 | Parks et al. | 395/825 |
| 5,590,375 | 12/1996 | Sangveraphunsivi et al. | 395/841 |
| 5,663,901 | 9/1997 | Wallace et al. | 395/500 |
| 5,678,023 | 10/1997 | Adams et al. | 395/183.04 |

OTHER PUBLICATIONS

PC Sources Nov. 1991 vol. 2 Nov. 11 p. 113.

*Primary Examiner*—Moustafa M. Meky
*Attorney, Agent, or Firm*—Donald R. Boys

[57] ABSTRACT

An IDE interface communicates with peripheral devices not conforming to ST506 specification by providing firmware to microcontrollers mounted on the non-conforming peripheral devices to translate between the data structure of an ST506 specification device and the data structure of the non-conforming device. CD-ROM and cartridge tape drive communication is provided. An enhanced IDE interface communicates with multiple peripheral devices by adding a selective ability to the firmware of the conventional IDE interface.

2 Claims, 6 Drawing Sheets

ENHANCED INTEGRATED DEVICE ELECTRONICS (EIDE) INTERFACE FOR CONTROLLING COMMUNICATION BETWEEN CPU AND NINE STORAGE DRIVES INCLUDING TAPE DRIVE, CD-ROM DRIVE, AND SEVEN HARD DISK DRIVES

CROSS REFERENCE TO RELATED APPLICATIONS

This is a continuation of application Ser. No. 08/033,839 filed Mar. 19, 1993, now abandoned.

FIELD OF THE INVENTION

This invention is in the field of peripheral device control and relates more specifically to control of data storage devices using an Integrated Drive Electronics (IDE) computer interface.

BACKGROUND OF THE INVENTION

An IDE controller is embodied in one or more Integrated Circuit (IC) chips that are integrated into an IDE peripheral device. The IDE controller handles address, data and control signals by means of which it can receive device control commands from a computer equipped with an IDE interface adapter that is compatible with the Industry Standard Architecture (ISA) computer Input/Output (I/O) bus or the Extended Industry Standard Architecture (EISA) computer I/O bus. The IDE computer interface circuitry is integrated into the motherboard of some computers and circuit boards containing the IDE computer interface circuits are available for installation in a connector slot of an ISA or EISA computer I/O bus. In the present invention the IDE referred to repeatedly is the IDE developed by Western Digital Corporation for Compaq Computer Co., and is fully compatible with ISA or EISA specifications. IDE has been used in the art to denote other and similar systems.

As a subset of its computer interface logic, the IDE controller emulates a prior art disk drive controller standard widely known as ST506, but also known as ST506/412 and ST412. ST506 is the only disk drive controller specification known to the applicant to be supported in the Basic Input Output System (BIOS) Read Only Memory (ROM) software of commonly available BIOS ROMs for AT-compatible computers. This compatibility with disk control software that is built into every AT-compatible computer, along with fewer, or smaller and less complicated, circuit boards and fewer interconnect cables, gives IDE a distinct cost advantage over other disk drive interface technologies. At the time of this application, AT-compatible computers with built-in IDE adapters and magnetic disk drives with built-in IDE controllers are widely available from numerous manufacturers.

A big disadvantage of prior art IDE interfaces is that they are only designed to support the device control and data transfer capabilities of random access magnetic disk drives. Such drives feature a three-dimensional storage geometry of multiple recording surfaces and multiple concentric data tracks, also known in the art as cylinders, using incremental step movable head assemblies to access the tracks. Each track is arbitrarily divided into a number of sectors, each containing a fixed number of data bits.

Another disadvantage of prior art IDE interfaces is that only two drives can be connected to an IDE computer interface. One known as the primary drive, which is generally the "boot" drive, and the other the secondary drive.

Manufacturers of devices that store data using some other geometries, such as the Compact Disk Read Only Memory (CD-ROM) with a single track spiral geometry, have been deterred from taking advantage of the high performance and low cost of the IDE interface, at least in part, by the two-drive limitation of IDE. They have usually developed a proprietary ISA bus interface adapter or have implemented a device controller compatible with the Small Computer System Interface (SCSI) controllers. Some designs incorporate a SCSI controller in the CD-ROM drive chassis and interface the SCSI controller to the computer through an ISA bus parallel printer adapter. Such designs impose an additional electrical and thermal load on the computer power supply and cooling systems and require availability of at least one ISA bus connector slot, thus reducing the number of other ISA bus devices that may be installed in the computer, except in the case of a SCSI compatible device when a SCSI ISA bus adapter is otherwise required in the system. Some less expensive magnetic tape drives are designed to interface with the computer via the floppy disk controller. The low data transfer rate characteristic of floppy disk controllers imposes a severe performance penalty and, as the most common floppy disk controllers are limited to two drives, imposes a configuration problem for many systems.

What is clearly needed is an Enhanced IDE (EIDE) interface that can provide I/O access to addressable block storage locations on devices other than magnetic disk drives such as CD-ROMs, writable Compact Disk devices, and can handle a multiplicity of secondary peripheral devices.

SUMMARY OF THE INVENTION

A computer system is provided according to the present invention having a CPU for performing calculations and logic sequences and for directing operations of the system, and RAM memory connected to the CPU for temporary storage of routines and data during operation. The computer system has an Integrated Drive Electronics interface for controlling communication between the CPU and two peripheral memory storage devices, one of which is an ST506 specification disk drive. The ST506 drive is addressed by the CPU as the primary IDE device. The second of the two storage devices is a non-ST506 specification device and is connected to the IDE interface and addressed by the CPU as the secondary IDE device.

The second device has a microcontroller for translating between the data addressing structure of a conventional ST506 specification device and the data structure of the second device.

In one embodiment the second device is a CD-ROM drive, and could also be a cartridge tape drive.

In another embodiment of the invention an Enhanced IDE (EIDE) is provided for managing communication between a CPU and peripheral data storage devices. The EIDE has integrated circuits for storing and performing control routines, connection to a computer bus, and connection to at least three data storage devices. There is also a control means as a part of the EIDE for receiving commands and data from the computer bus and for sending commands and sending data to and receiving data from the peripheral devices. The control means has a selective capability for selecting individual ones of the non-primary devices as secondary devices with a unit select number.

The invention also encompasses the method of communicating with individual ones of a plurality of non-ST506 specification devices with an enhanced IDE including the selectivity enhancement.

The invention provides a new ability to include a variety of peripheral data storage devices in a computer system in a reliable and inexpensive manner, and also to utilize existing and standard equipment to a maximum degree.

DESCRIPTION OF THE PREFERRED EMBODIMENTS

CD-ROM Drive Using IDE Interface

Figure 1:
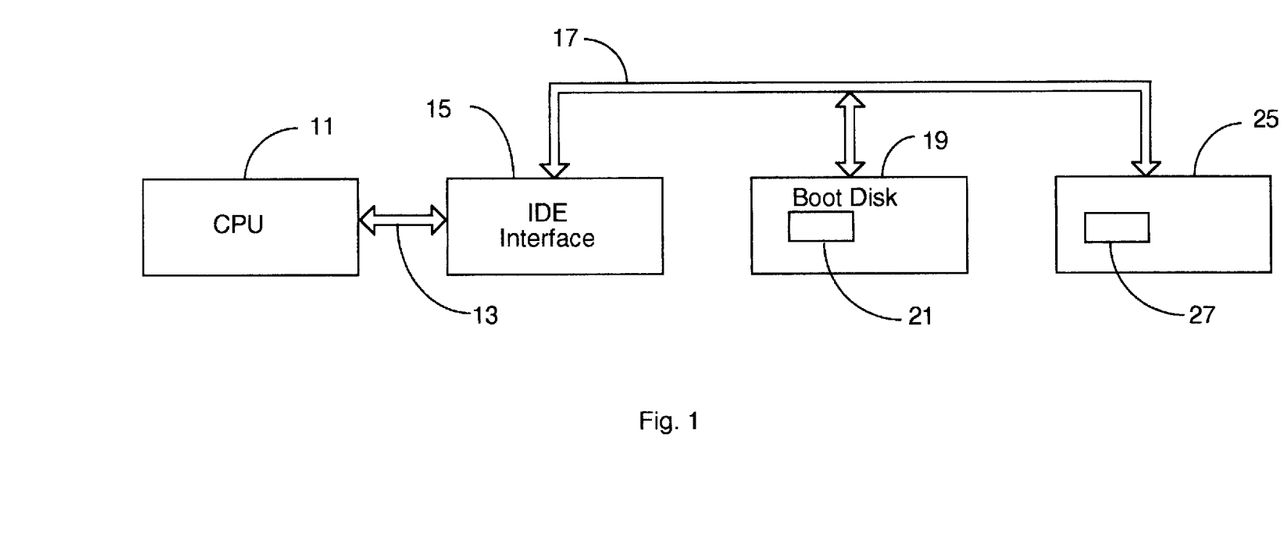
FIG. 1 is a block diagram showing connection of a CD-ROM through an IDE interface according to the present invention.

FIG. 1 is a block diagram illustrating operation of a CD-ROM drive according to the present invention. Central Processing Unit (CPU) 11 communicates on conventional computer bus 13 with IDE interface adapter 15, which conventionally handles translation of communication signals between bus 13 and IDE controller 21 in primary device 19, typically via a flat cable 17, although other kinds of multiple-conductor cables may be used. A third connector on cable 17 permits connection of a secondary device, which in this embodiment is a CD-ROM drive 25 with a microcontroller 27 according to the present invention. Microcontroller 27 translates the data addressing structure of a comparable or greater capacity ST506 specification disk drive to the data addressing structure of CD-ROM 25 and exercises control over its electrical and mechanical functions. The data structure of each is well known in the art, and one with ordinary skill in the art is capable of implementing such a translator.

In one embodiment, microcontroller 27 is implemented by means of one or more IC chips that execute a firmware program that is stored somewhere on the CD-ROM device. Many IDE magnetic disk drives have the microcontroller firmware stored on the disk in reserved sectors that are not addressable for normal data storage. During the power-on sequence a bootstrap routine reads the firmware from disk into Random Access Memory on the drive controller board. For interchangeable media devices such as CD-ROM drives this approach is not feasible, because there are no sectors that may be reserved in the sense of a disk configuration. For interchangeable media devices, including CD-ROM drives, microcontroller 27 firmware is provided by means of nonvolatile semiconductor memory such as one of the various types of Read Only Memory (ROM) on the device. An EPROM or EEPROM device is an example. Alternatively there may be a small portion of firmware on the peripheral device to allow downloading of the balance of the firmware from CPU 11.

Firmware for microcontroller 27 enables it to control the IDE bus interface of CD-ROM 25 according to established protocols for IDE devices, known in the art. The firmware also translates three-part data addresses transmitted from CPU 11 into corresponding CD-ROM sector addresses and causes the drive mechanism to position the transducer and perform the requested operation.

Figure 2:
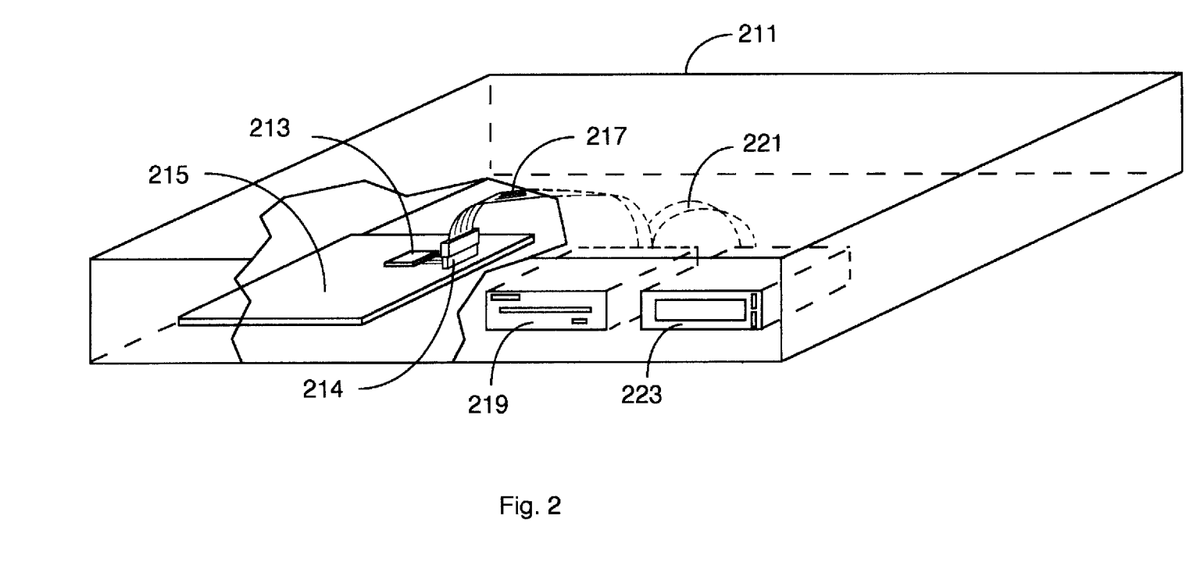
FIG. 2 is an isometric view of a computer system showing connection of a CD-ROM drive through an IDE interface according to the present invention.

FIG. 2 is an isometric drawing of a computer 211 showing the physical connection of an internal CD-ROM drive 223, equipped with a controller such as controller 27 of FIG. 1 and firmware according to the present invention, as a secondary device on IDE interface adapter 213 on motherboard 215 to the ISA bus (not shown) coupled to a motherboard. The IDE interface adapter 213 in this embodiment is shown as a single unit, but may be implemented in more than one chip on the motherboard.

A conventional IDE hard disk 219 is the primary device in this configuration and is connected to the IDE adapter on the motherboard through a separable connector 214 and cable 217. A third connector (not shown) on ribbon cable 217 couples CD-ROM 223 to primary drive 219 and hence to IDE interface adapter 213.

Cartridge Tape Drive Using IDE Interface

Figure 3:
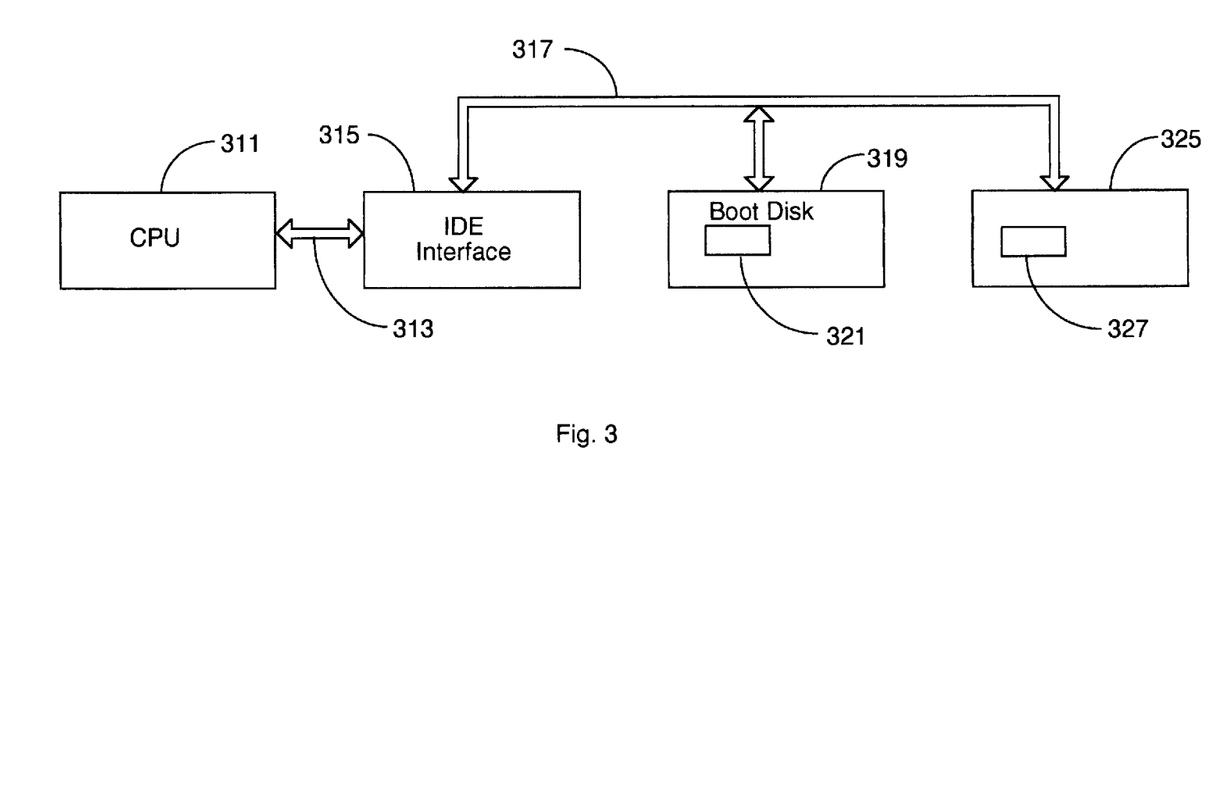
FIG. 3 is a block diagram showing connection of a cartridge tape drive through an IDE interface according to the present invention.

FIG. 3 is a block diagram illustrating operation of a cartridge tape drive according to the present invention. CPU 311 communicates on conventional bus 313 with IDE interface adapter 315, which conventionally handles translation of communication signals between the bus and IDE controller 321 on primary device 319, typically via a cable 317. A third connector on cable 317 allows connection of a secondary device, which in this embodiment is a cartridge tape drive 325 with a microcontroller 327 according to the present invention. Microcontroller 327 translates the data addressing structure of a comparable or greater capacity ST506 specification disk drive to the data addressing structure of the cartridge tape drive.

In another embodiment, microcontroller 327 is an IC chip that executes a firmware program that is stored on the tape drive. As in the case of the CD-ROM drive described above, the tape drive is an interchangeable media device, and the firmware for the microcontroller may not be stored on the tape. Rather it is stored in ROM of some sort, or downloaded from CPU 11, as described above for the implementation of the CD-ROM.

Firmware for microcontroller 327 causes it to control the IDE bus interface of tape drive 325 according to established protocols for IDE devices. The firmware also translates three-part data addresses provided by CPU 311 to the corresponding tape block address and causes the drive mechanism to position the transducer and perform the requested operation.

Figure 4:
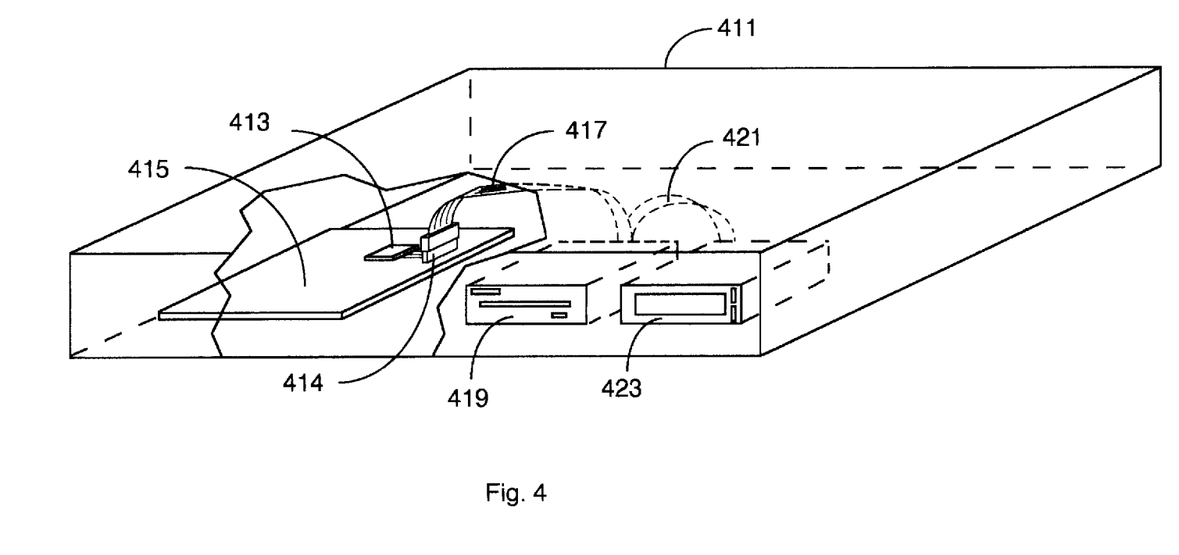
FIG. 4 is an isometric view of a computer system showing connection of a cartridge tape drive through an IDE interface according to the present invention.

FIG. 4 is an isometric drawing of a computer showing the physical connection of an internal cartridge tape drive 423, equipped with a microcontroller 327 (not shown) according to the present invention, as a secondary device on IDE interface adapter 413 coupled to the bus (not shown) through motherboard 415. Microcontroller 327 translates the data addressing structure of a comparable or greater capacity ST506 specification disk drive to the data addressing structure of the cartridge tape drive. A conventional IDE hard disk 419 is the primary device in this configuration. The IDE interface adapter is connected to primary disk drive 419 and cartridge tape drive 423 by ribbon cable 417 through connector 414.

Multiple Secondary Devices Using EIDE Interface

Figure 5:
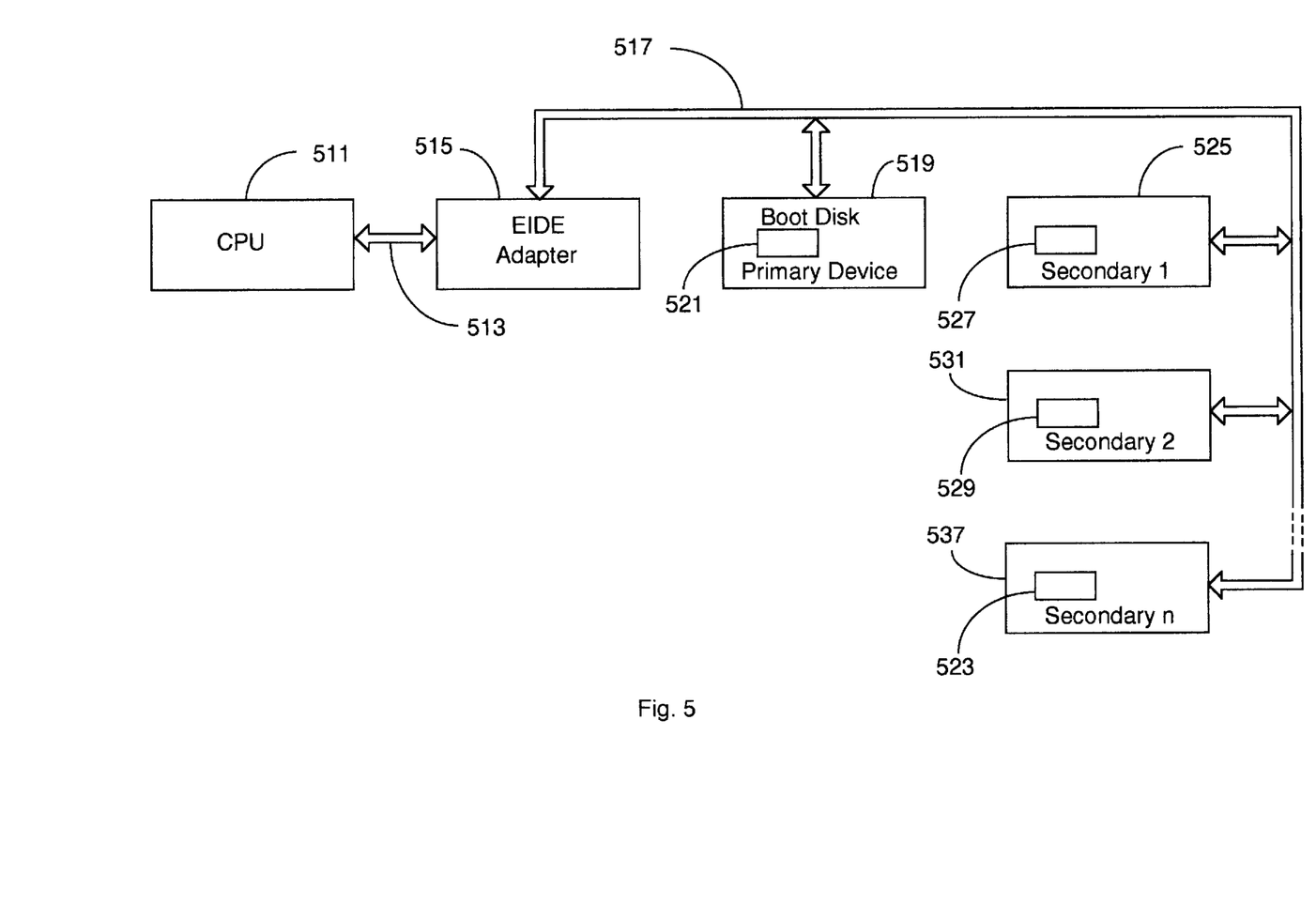
FIG. 5 is a block diagram showing connection of components in a computer system having an enhanced IDE interface according to the present invention.

FIG. 5 is a block diagram showing an EIDE interface according to the present invention wherein CPU 511 communicates with EIDE adapter 515 on bus 513 and through cable 517 to primary peripheral device 519 and a plurality of secondary devices 525, 531 . . . 537, each equipped with a microcontroller (527, 529, 523) according to the present invention. Boot disk 519 has a controller 521 configured to communicate with adapter 515 as well. In this embodiment of the invention, the IDE controller firmware is enhanced to allow multiple secondary devices to be individually selected as the active drive.

In the preferred mode for this embodiment, one primary device and eight secondary devices can be connected to the EIDE adapter and individually addressed by the CPU. It will be apparent, however, to one with skill in the art, that there could be more or fewer secondary devices than the eight in the embodiment described.

In the preferred embodiment the EIDE is implemented by EIDE microcontroller firmware and by assigning a unique unit number to each secondary device, which may be done in a number of ways. The preferred method is to imbed a unit number in the firmware at each peripheral device. In alternative embodiments the unit number may be assigned by means of jumper wires, bridge pins or selector switches on the drive circuit board.

In the EIDE according to the present invention, the secondary devices can be a mix of disk drives, CD-ROM drives, and cartridge tape drives, with each having an EIDE microcontroller controller and firmware to translate between the EIDE protocol and the protocol of the particular device. Existing IDE compatible disk drives that store the microcontroller firmware on the disk can be enhanced by means of a utility program to instruct the controller to overwrite its firmware sectors on the disk with the EIDE firmware transmitted by the program. Prior to transmission, the firmware could be customized with a user specified unit number embedded in the firmware for devices lacking any hardware method of unit number assignment.

At Power-on or Reset after completing the self-test routines in the microcontroller firmware the primary IDE device enters the active state and all secondary devices enter the idle state. When the CPU issues the IDE command to select the secondary device, the primary device enters the idle state according to standard IDE protocol. In a departure from standard IDE protocol, all EIDE secondary device controllers remain in the idle state. The next IDE command, called in the invention Unit Select, is a command not defined in the conventional IDE protocol, and causes the EIDE controllers to compare the transmitted Unit Select data value with the device unit number. The device having a matching unit number enters the active state. All other secondary controllers remain in idle, or inactive state. The activated device will thereafter respond to IDE commands in accordance with standard protocols.

Subsequent Unit Select commands may be issued to switch the active device among the secondary devices. Issuance of the conventional IDE command to select the primary device will force the currently active secondary device into the idle state in conformance with standard IDE practice. It will be apparent to one with skill in the art that existing IDE disk drives may be used, without alteration, as primary devices in conjunction with EIDE secondary devices.

Figure 6:
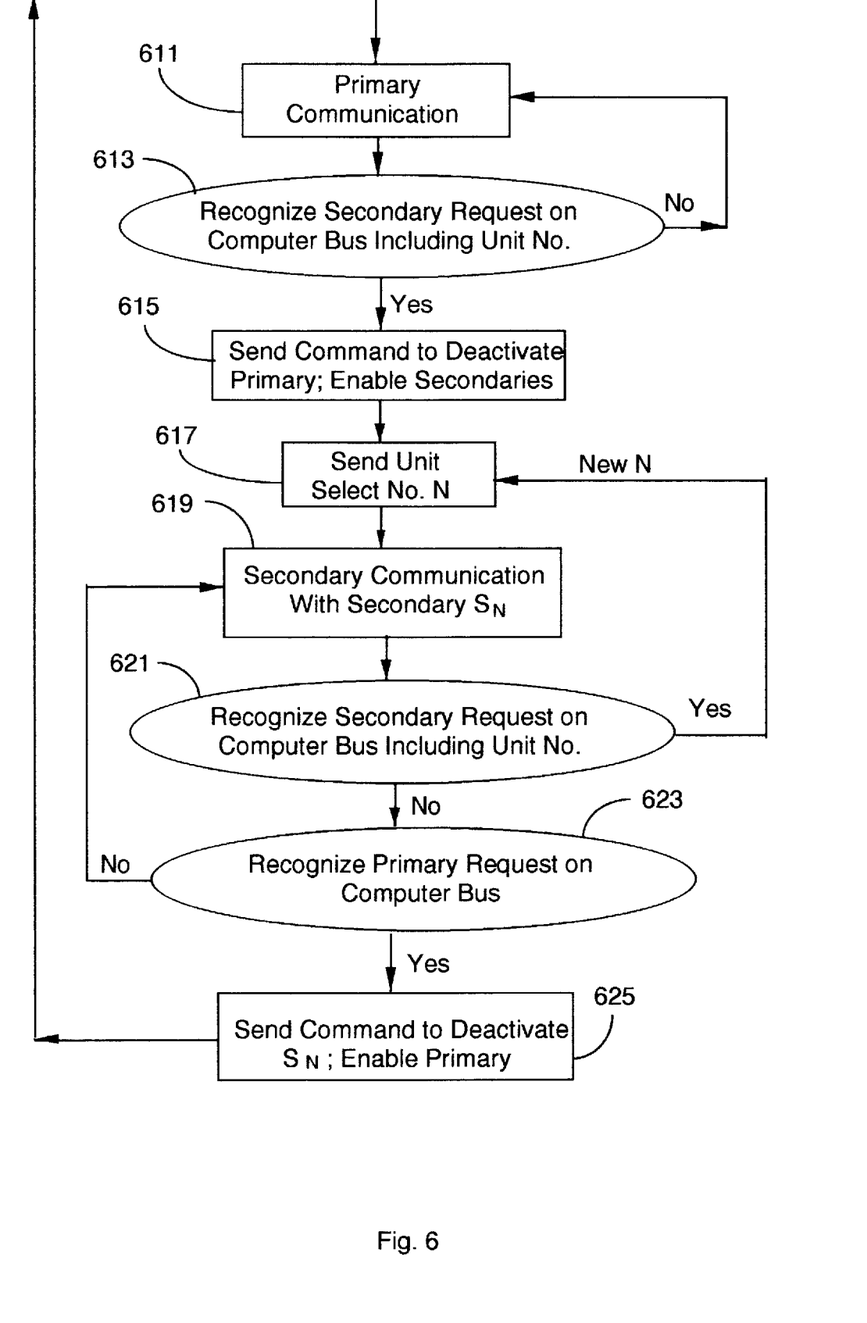
FIG. 6 is a flow diagram showing the change of states of the system of FIG. 5.

FIG. 6 is a flow diagram illustrating the change of states and general commands issued by the EIDE in the present invention. Beginning at state 611, communication is between the computer bus and the primary device. The EIDE firmware monitors the computer bus for a request to communicate with a secondary device (613). If no request is forthcoming, communication with the primary device is maintained.

If (and when) there is a request on the bus for communication with a secondary device, including data to identify the particular device, the EIDE sends a command on the peripheral connection cable to deactivate the primary and enable the secondary devices (615). The EIDE then sends the Unit Select command (617). The Unit Select command causes the device having the unit number to become active (621), and communication proceeds with the secondary device, $S_N$.

Meanwhile the EIDE continues to monitor the computer bus and the primary and secondary devices continue to monitor the peripheral cable. If communication with a different secondary device is required, and communication with a secondary is in progress, the EIDE notes the new request on the bus (621) and sends a new unit number (617), causing the activity to shift from the secondary with the original number to the secondary with the new number (619).

If the EIDE notes a primary request on the bus (623), it sends the command to deactivate the secondary device and activate the primary. The state then goes back to communication with the primary (611).

It will be apparent to a worker with skill in the art that there are many changes that might be made in the embodiments disclosed above without departing from the spirit and scope of the invention. Several have been noted, such as the fact that with an EIDE interface according to the invention, there may be one or many more than one peripheral devices connected to an EIDE interface and addressed individually by a Unit Select command. CD-ROM drives, disk drives, and cartridge drives have been listed and described as connected to an EIDE interface according to the invention, but other types might also be connected, such as flash card memory units as known in the art. It is only necessary that a microcontroller be installed with the device to accomplish the necessary command translation, and to store the Unit Select command device number for addressing purposes. There are similarly many other alterations that might be made without departing from the spirit and scope of the invention.

What is claimed is:

1. An Enhanced Integrated Device Electronic (EIDE) interface system for managing data communication between a CPU and nine connected digital mass storage drives according to an enhanced IDE (EIDE) communications protocol, the nine drives including one tape storage drive, one CD-ROM drive, and seven IDE magnetic hard-disk drives, the system comprising:

Control circuitry connected to the CPU for storing and performing control routines; and nine connectors, each connected to the control circuitry and to individual ones of said connected digital mass storage drives;

said control circuitry configured for selecting one of the hard-disk drives as a primary drive according to standard IDE protocol, and for selecting each of the remaining digital mass storage drives individually as secondary drives differentiated by a unit select number comprising three digital bits, wherein each storage drive equipped with a microcontroller to translate between the EIDE protocol and the protocol of the drive, and to store a unit select number.

2. A computer system comprising:

a CPU for performing calculations and logic sequences, and for directing operations of said computer system;

a digital memory connected to said CPU for temporary storage of routines and data during operation;

an Enhanced Integrated Device Electronic (EIDE) interface adapted for controlling communication between said CPU and nine memory storage drives according to an enhanced IDE (EIDE) communications protocol, one of the nine drives being a tape storage drive, one being a CD-ROM drive, and seven being IDE magnetic hard-disk drives;

wherein the EIDE interface selects on of the hard-disk drives as a primary drive according to IDE protocol, and the other eight drives as secondary drives differentiated by a three-bit unit select number in the EIDE interface and each storage drive equipped with a microcontroller to translate between the EIDE protocol and the protocol of the drive and to store a unit select number.

* * * * *